Figures 2, 3:
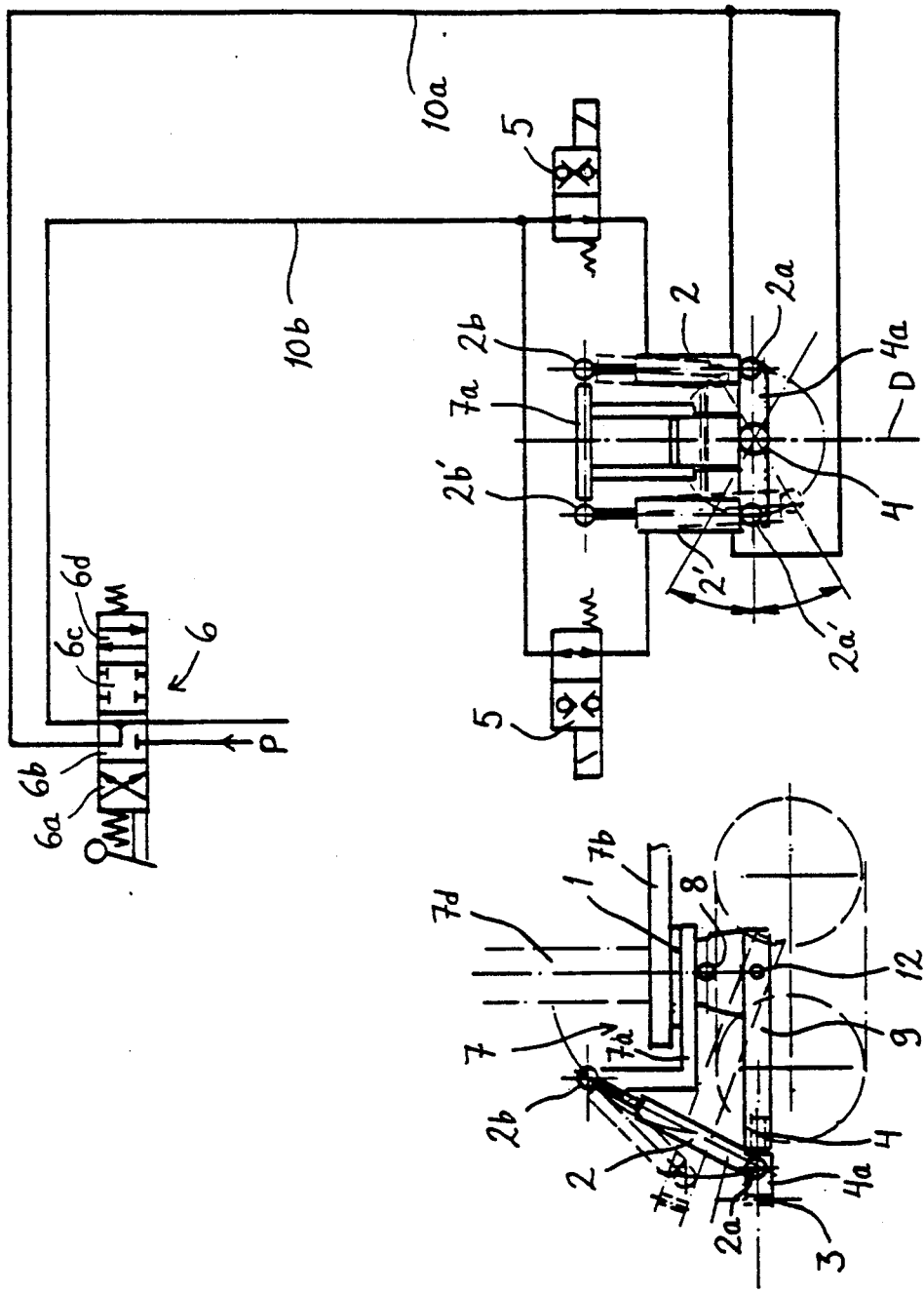

United States Patent [19]

Karilainen et al.

[11] Patent Number: 5,328,197
[45] Date of Patent: Jul. 12, 1994

[54] LOAD DISTRIBUTORY AND ARTICULATING SYSTEM IN ALL TERRAIN VEHICLE OF A TRACTION AND TERRAIN

[76] Inventors: Lasse Karilainen; Markku Karilainen, both of Karhunkatu 10 A, SF-33530 Tampere, Finland

[21] Appl. No.: 663,882
[22] PCT Filed: Sep. 11, 1989
[86] PCT No.: PCT/FI89/00171
§ 371 Date: Mar. 12, 1991
§ 102(e) Date: Mar. 12, 1991
[87] PCT Pub. No.: WO90/02681
PCT Pub. Date: Mar. 22, 1990

[30] Foreign Application Priority Data

Sep. 12, 1988 [FI] Finland .................................. 884173

[51] Int. Cl.⁵ .......................................... B62D 63/00
[52] U.S. Cl. ............................ 280/406.1; 280/405.1; 280/407
[58] Field of Search ................... 280/840, 6.12, 404, 280/405.1, 406.1, 407, 407.1, 426, DIG. 1; 180/14.2, 9.4, 9.42

[56] References Cited

U.S. PATENT DOCUMENTS

| | | | |
|---|---|---|---|
| 2,642,293 | 6/1953 | Simmons | 280/406.1 |
| 3,225,851 | 5/1960 | Simmons et al. | 280/406.1 |
| 3,473,619 | 10/1969 | Dion | 180/14.4 |
| 3,484,843 | 12/1969 | Martin | 280/840 |
| 3,670,822 | 6/1972 | Reinhardt | 172/7 |
| 3,973,639 | 8/1976 | Stewart | 180/14.2 |
| 4,353,572 | 10/1982 | McCain | 180/14.1 |
| 4,552,238 | 11/1985 | Joyce, Jr. | 180/139 |

FOREIGN PATENT DOCUMENTS

WO82/03049 9/1982 PCT Int'l Appl. .

*Primary Examiner*—Margaret A. Focarino
*Assistant Examiner*—Anne Marie Boehler
*Attorney, Agent, or Firm*—Schweitzer Cornman & Gross

[57] ABSTRACT

A load distributing and articulating system in an all terrain vehicle of a tractor and a trailer arranged along a longitudinal axis. The trailer has a trailer body with a load section thereon. The system comprises a first pivot for articulating rotation between the tractor and the trailer in a vertical plane perpendicular to the longitudinal axis, about the longitudinal axis; a second pivot for articulating rotation between the trailer body and the load section, in a vertical plane along the longitudinal axis, about an axis perpendicular to the longitudinal axis; at least two variable length actuators disposed between the tractor and the load section for controlling rotation about said first and second pivots; an adjustable controller for varying the lengths of the variable length actuators independantly of each other; and a device for preventing the adjustable controller from varying the lengths of the variable length actuators, and for enabling variation of the lengths thereof.

6 Claims, 2 Drawing Sheets

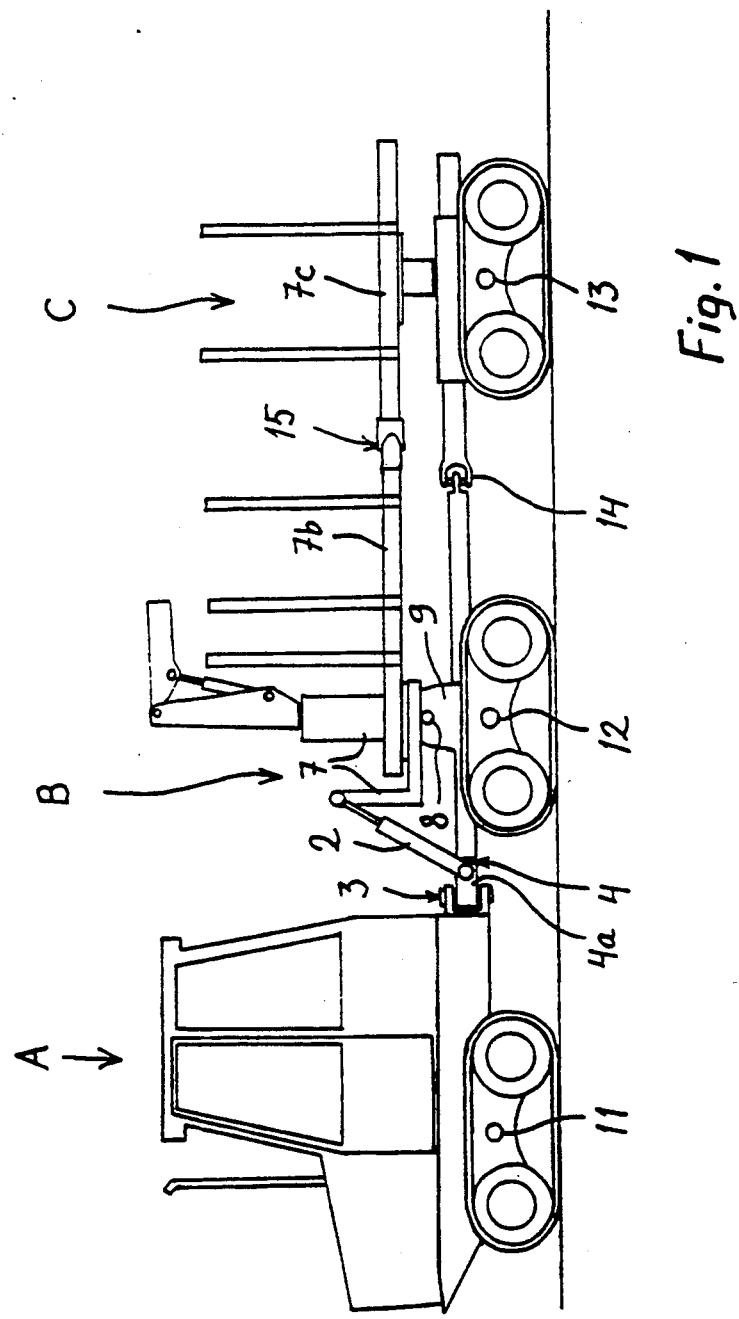

LOAD DISTRIBUTORY AND ARTICULATING SYSTEM IN ALL TERRAIN VEHICLE OF A TRACTION AND TERRAIN

The present invention relates to a transmission and articulation arrangement between a terrain vechicle and a trailer.

Terrain vehicles known today, for example of the type shown by Finnish Patent Application No. 854777, have an articulation of rotation between a tractive vehicle and a trailer. This articulation provides for rotating movement of the two sections relative to each other in a vertical plane perpendicular to the driving direction during the operation in the terrain. The articulation of rotation is further equipped with an actuator, such as a hydraulic cylinder, which is attached at its ends respectively to the opposite sides of the articulation of rotation and which can be immobilized at a desired length thereof in order to make the articulation of rotation immobile.

The devices of the type explained above have often the need of adjustment of weight to various points longitudinally of the vehicle combination. For providing such an operation, an actuator is mounted between the body of the trailer and a body section pivotable on the body in a vertical plane extending longitudinally of the vehicle. The actuator provides for pivoting of said load section and accomplishes so the desired weight distribution in the longitudinal direction of the vehicle combination.

A drawback in the above-mentioned arrangements is in that each of the actuators accomplishes only one single operation, which has the need of their separate control as a result. Moreover, the construction is not as steady as one might desire.

The object of the invention is to disclose an arrangement, which makes it possible to eliminate the above-mentioned drawbacks. The invention is based on the idea of providing two actuators between the terrain vehicle and the trailer, the actuators co-operating both in immobilizing the angle of rotation and in shifting the weight, without each of them being designed for a single function only. In the practice, the ends of the actuators facing the terrain vehicle are attached to a rotary part of the articulation of rotation, the part being the one which in the articulation is on the terrain vehicle side, and the other ends are attached to the above-mentioned load section pivotable relative to the body section of the trailer. The provision above makes it possible to control the actuators with their common control means and further improves the steadiness of the construction.

The appended unindependent claims show some advantageous alternatives of realization of the arrangement in accordance with the invention, which help to optimize the benefits of the invention.

In the following, the invention- is described in more detail with reference to the accompanying drawings, wherein FIG. 1 is a side elevation view of the terrain vehicle and the trailer incorporating the arrangement in accordance with the invention, FIG. 2 is a more detailed representation of the arrangement in side elevational view, and FIG. 3 is a schematic representation of the arrangement as seen from the tractive vehicle and it includes also a control diagram illustrating the operation of the arrangement.

FIG. 1 shows a combination of a terrain vehicle and a trailer, in which the invention is applicable. The terrain vehicle, which is the tractive vehicle, is in this case a forest tractor A comprising a front axle 11 carrying tracked wheels. A trailer B is joined to the tractive vehicle A through an articulation of turning 3 and an articulation of rotation 4. The trailer B comprises the middle axle 12 of the vehicle combination, and it also carries pairs of tracked wheels. The terrain vehicle and trailer form in this case a so-called body-steered vehicle combination, in which the steering takes place by acting on the articulation of turning 3 of the vehicle A. A rear body C is joined to the trailer B through a hitch 14. The rear body has a rear axle 13 also carrying pairs of tracked wheels. The purpose of the hitch 14 is to ensure the guiding of the rear body C so that it follows the same tracks, and the actual tractive connection is provided by means of a load section which will be described hereinafter. The vehicle type in question is a so-called three-axle, six-track vehicle combination, wherein all tracks are so-called driven rocking tracks. This kind of combination is disclosed for example in Finnish Patent Application No. 854777, and its function is not more analysed in this application except as to details connected with the invention. It will of course be understood that the invention can be utilized also in other types of terrain vehicle combinations comprising a terrain vehicle and a trailer joined thereto. For example, the vehicle combination of FIG. 1 does not always incorporate the rear body C. The term trailer shall in this context be interpreted as either a rear section which is an integral part of a vehicle combination steered at the body, or as a trailer which can be detachably mounted after a tractive vehicle.

A load section 7 is fixed to the body 9 of the trailer B through a horizontal articulation 8. The horizontal articulation 8 provides the pivoting of the load section 7 in a vertical plane extending longitudinally of the trailer. The load section 7 continues towards the rear in the form of a beam 7b extending longitudinally of the trailer. The beam is articulated through an articulation of rotation 15 on the beam 7c mounted in the rear body C and retaining its alignment with the beam 7b. The beam 7c is pivotable relative to the rear body in a horizontal plane. Said beams carry the actual load space, whereupon the load such as felled trees can be charged for transport. A support 7d for a grab loader is mounted on the load section, and the former is connectable to other implements as well, such as a tree harvester or processor for example.

FIGS. 2 and 3 show the construction of the combination in more detail at the articulation of rotation and the trailer. The load section 7 comprises a part 7a articulated on the trailer body 9 through the horizontal articulation 8, as well as on top of said part, the actual load bearing part 7b turnable in a horizontal plane by means of a turntable 1. Said load bearing part 7b consists of the afore-mentioned rearwardly extending beam. A support 7d for the above-mentioned loader is fixed on top of the part 7b.

The part 7a of the load section extends from the horizontal articulation 8 towards the terrain vechicle A, and one end 2b of a hydraulic cylinder 2, namely the piston rod of the cylinder, is pivotably attached thereto at this load section end facing the terrain vehicle. The opposite end 2a of the hydraulic cylinder 2, namely the cylinder body, is attached to a part 4a located on the terrain vehicle side in the articulation of rotation 4. Laterally of the hydraulic cylinder 2 there is mounted another cylinder 2' which is fixed at both its ends to corresponding points in a corresponding manner, and the pertinent points of attachment are designated by reference numerals 2b' and 2a'. As it is clear from FIG. 3, said points of attachment both in the load section 7 and the part 4a of the articulation of rotation are located on the opposite sides of a vertical plane extending along the axis of rotation of the articulation of rotation, said plane being denoted by a dashed broken line D in FIG. 3. Said arrangement improves the solidity and function of the construction. Further, the hydraulic cylinders 2 and 2' are so fixed, that they extend in parallel relationship to each other and symmetrically with respect to said vertical plane D when the vehicle A and the trailer B are situated in a common horizontal plane.

In addition, two steering cylinders (not shown) are connected to the part 4a of the articulation of rotation, these cylinders being attached to the part 4a and to the body of the vehicle A at both sides of the articulation of turning 3. Using these cylinders, the vehicle combination can be steered by turning at the articulation of turning 3.

The primary principle of operation of the invention is to change the sum length of the cylinders 2, 2' in order to cause a change in the pivotal position of the load section 7 relative to the horizontal articulation 8, and simultaneously, as said pivotal position has an effect as far as on the rear body C through the rearwardly extending beam 7b, the weight can be shifted longitudinally of the vehicle combination to a predetermined track axle. In this predetermined position the cylinders 2 and 2' are, however, free to change their lengths to a limited extentd in such a fashion, that as the length of one cylinder increases, that of the other decreases. This is necessary for the rotary movement of the vehicle side part 4a of the articulation of rotation 4 with respect to the body section 9 of the trailer B. Said parts can be immobilized at a predetermined position of rotation by locking the cylinders 2 and 2' at a predetermined length, that is, the quadrangle constituted of the points of attachment 2b, 2b', 2a, 2a' is immobilized to a rigid configuration. This is to immobilize the trailer relative to the tractor, such as during loading and unloading. This forms the other purpose of the invention, accomplished by the co-operation of the same cylinders 2, 2' that serve to shift the weight. Broken lines illustrate the pivoting of the lead section 7 in FIG. 2 and the rotary movement of the lead section 7 in FIG. 3.

In the following, the operation of the invention is explained in more detail with reference mainly to the operational diagram of FIG. 3.

The hydraulic-cylinders 2 and 2' are usual double-acting cylinders, whose work space adjacent to the points of attachments 2b, 2b' to the lead section 7 will be called the end at the lead section, and the work space on the opposite side of the piston adjacent to the points of attachment 2a, 2a' to the part 4a of the articulation of rotation 4 will be called the end at the articulation of rotation. The ends at the lead section are connected parallelly to the hydraulic fluid line 10b and the ends at the articulation of rotation are connected parallelly to the line 10a. The lines 10a and 10b pass through a control block 6, by means of which the supply of the hydraulic fluid from a pump P into the cylinders 2 and 2' is controlled. FIG. 3 represents the hydraulic cylinders at a so-called floating position, that is, the control block is at its floating position (the block section 6b is at the lines 10a and 10b), said position permitting the hydraulic fluid to flow freely between the lines 10a and 10b, which means that the points 2a, 2a', 2b and 2b' are free to move with respect to each other within the range allowed by the articulations 4 and 8. Further, both branches directed to the respective cylinders from the line 10b are provided with on-off valves 5, which are operated simultaneously. The on-off valves are connected to a drive pedal. In the situation of FIG. 3 the on-off valves are open allowing the flow of the hydraulic fluid in the branches of the line 10b which are connected to the cylinders 2 and 2'.

As the vehicle combination is moving, the drive pedal is held down, which maintains the open position of the on-off valves 5. At the same time the control block 6 is in its floating position shown in the figure. The horizontal articulation 8 is thereby free to pivotal movement, but the elongate beam 7b, 7c extending to the rear body C and possibly bearing a load thereupon, ensures that the support of the loader does not cause the tilting of the body section 7. When the operator wants to use the cylinders 2 and 2' for shifting weight in order to change the axle weights, the control block 6 is shifted to the middle position, whereat it closes the communication between the lines 10a and 10b (block section 6c situated at the lines 10a and 10b). At this stage the hydraulic fluid moves freely in a closed circulation between the same ends of the cylinders, that is, between the ends at the load section in the branches of the line 10b, and between the ends at the articulation of rotation in the branches of the line 10a. The points of attachment and the cylinders are so dimensioned that as the articulation of rotation 4 is rotated, in a vertical plane that is perpendicular to the longitudinal axis of the vehicle the changes of the volume of the hydraulic fluid in the same ends of the cylinders 2 and 2' are always of substantially equal absolute value and have opposite directions so that the hydraulic fluid exiting from one cylinder will be well accommodated within the work space on the same side in the other cylinder. Hence, the load section 7 will always remain at a predetermined level determining the distribution of the axle weights, regardless of the movement of the articulation of rotation 4. The symmetrical location of the cylinders 2 and 2' with respect to the plane D results in the practice to cylinder strokes of equal length, in other words, a flow of a predetermined magnitude from/to a cylinder effects an equal change of length in both cylinders.

As the operator wants to change the position of the load section 7 and consequently the axle weight distribution, the sum length of the cylinders will be changed. For example, by shifting the control block to the rightmost position (block section 6a at the lines 10a and 10b) the hydraulic fluid flows from the pump P to the line 10b causing a decrease in the sum length of the cylinders, the load section 7 is tilted closer to the vehicle A and the weight will be shifted more on the middle axle 12. Correspondingly, as the control block is in the leftmost position (block section 6d at the lines 10a and 10b), the hydraulic fluid will flow to the line 10a, the load section 7 will be tilted more away from the vehicle A and it will transmit the weight through the beam 7b more on the rear axle 13. In this event more weight will be shifted on the front axle 11 as well. After these steps the control block 6 can be further shifted to its middle position, where the lines 10a and 10b are separated from each other.

As the machine is stopped/the drive pedal is unoperated and the on-off valves 5 will automatically shift in line with the branches of the line 10b causing the locking of the cylinders 2 and 2' at the particular length which they had at the moment of freeing the drive pedal. In this event the articulation of rotation 4 is immobilized, as is also the load section 7. By virtue of this the machine is stable on loading and unloading, because the tilting point is at the outer edge of the machine and the whole weight of the machine can be utilized. As the machine is started, the drive pedal is actuated again, causing the opening of the on-off valves 5 and the fluid is again free to flow between the ends of the cylinders 2 and 2' at the lead section 7.

As the vehicle combination is used for example as a tree harvester, the rear body C has been detached from the combination, which in this case will be two-axled. The function is in this case similar, for example when driving, the on-off valves 5 are open. The control block must thereby be at the middle position (6c), which enables the maintaining of the loader support in the lead section 7 in its place (the horizontal articulation 8 is not pivoted) regardless of the position of the articulation of rotation 4. When the machine is stopped, the on-off valves 5 are closed and the articulation of rotation 4 is immobilized. If the operator wants to adjust the position of the loader support it can be accomplished by moving the lead section 7 by changing the length of the cylinders 2 and 2' by means of the control block 6. When doing so, the on-off valves 5 are to be opened when the machine is standing.

The invention is not restricted only to the embodiment disclosed in the preceding description and the accompanying drawings, but it can be modified within the scope of invention presented by the claims. The actuators can be also other kinds of actuators having a variable length, such as for example a threaded shaft, which can be shifted by means of a threaded sleeve. The operations controlling said means can be provided also electrically, for example in an analogous manner in compliance with the afore-disclosed hydraulic diagram. When the arrangement is used in connection with vehicle combinations having a hydraulic drive, it is of course advisable to use hydraulically operated cylinders as actuators. It will also be understood, that the controlling operations of the device may be provided in an alternative fashion and they may be incorporated in various ways in the control logic of the vehicle combination.

We claim:

1. A load distributing and articulating system in an all terrain vehicle of a tractor and a trailer along a longitudinal axis, the trailer having a trailer body with a load section thereon, which comprises:
   (i) a first pivot for articulating rotation between the tractor and the trailer in a vertical plane perpendicular to the longitudinal axis, about the longitudinal axis;
   (ii) a second pivot for articulating rotation between the trailer body and the load section, in a vertical plane along the longitudinal axis about an axis perpendicular to the longitudinal axis;
   (iii) at least two variable length actuator disposed between the tractor and the load section for controlling the rotation about said first and second pivots;
   (iv) an adjustable controller having a plurality of positions, for varying the lengths of said variable length actuators together, and for allowing a variation of the lengths of said variable length actuators independently of each other; and
   (v) means for preventing said adjustable controller from varying the lengths of said variable length actuators, and for enabling variation of the lengths of said variable length actuators.

2. A load distributing and articulating system in an all terrain vehicle having a tractor and a trailer load section arranged along a longitudinal axis, the trailer load section being arranged over a trailer body, which comprises a first pivot between the tractor and the trailer body, said first pivot having a part at said tractor and another part at said trailer body, a second pivot between the trailer body and the trailer load section, a pair of two ended variable length actuators each attached at one end thereof to the trailer load section for shifting weight to various points along the longitudinal axis, the other ends of each of said variable length actuators are attached to said part of said first pivot at the tractor, a variable position controller attached from said first and said second variable length actuators for changing the total length of said variable length actuators to cause a change in the angle between the trailer load section and the trailer body and thereby shift said weight, and for locking the length of said variable length actuators in a preselected position for maintaining a constant pivot angle between the tractor and the trailer, one end of each of said first and said second variable length actuators is attached from said first pivot part on the tractor, and the other end of each of said first and said second variable length actuators is attached along opposite sides of a vertical plane extending along the axis of rotation of said first pivot, in a given position of said variable position controller, a change in the angle of rotation of said first pivot causes a change in the length of said first variable length actuator that is in the opposite direction than the change in the length of said second variable length actuator.

3. The load distributing and articulating system of claim 2, wherein both of said first and said second variable length actuators are identical to each other.

4. The load distributing and articulating system of claim 2, wherein both of said hydraulic cylinders are identical to each other, and are connected parallel to each other by hydraulic lines.

5. The load distributing and articulating system of claim 2, wherein similarly located ends of said two actuators are connected with each other through hydraulic lines said variable position controller being adapted to block the flow of hydraulic medium between oppositely located ends of said actuators but to permit the flow of hydraulic medium through hydraulic lines between said similarly located ends.

6. The load distributing and articulating system of claim 5, further comprising selective blocking means for selectively blocking and permitting the flow of hydraulic medium in a hydraulic line between said similarly located ends.

* * * * *